May 18, 1926.
S. K. ROSENTHAL
1,585,264
METHOD OF AND APPARATUS FOR TAKING STEREOSCOPIC INTRAORAL RADIOGRAPHS
Filed May 25, 1922
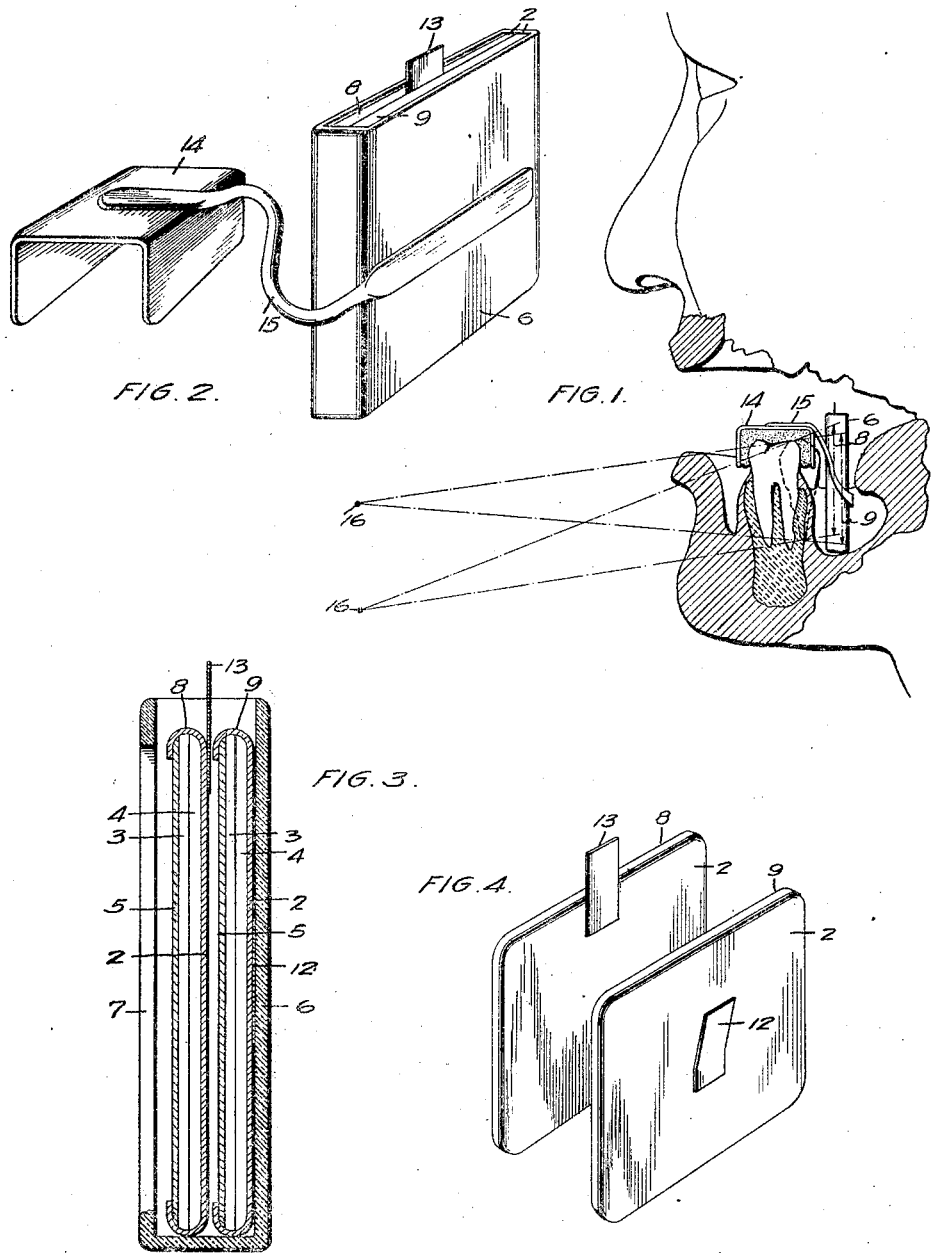
INVENTOR.
S. K. Rosenthal.

Patented May 18, 1926.

1,585,264

UNITED STATES PATENT OFFICE.

SIDNEY K. ROSENTHAL, OF BERKELEY, CALIFORNIA.

METHOD OF AND APPARATUS FOR TAKING STEREOSCOPIC INTRAORAL RADIOGRAPHS.

Application filed May 25, 1922. Serial No. 563,599.

This invention relates to a method and apparatus for taking intraoral radiographs of teeth and more particularly for taking stereoscopic radiographs.

It is an object of this invention to devise a novel method of taking stereoscopic radiographs of the teeth characterized by the use of two superposed sensitive films separated by a radio opaque member, the method consisting of exposing each film successively the second being exposed after shifting the relative position between the source of radiation and the remaining film.

It is a further object of this invention to devise an apparatus for taking stereoscopic radiographs in which the films are removably positioned within a film holder and are separated by radio opaque screens so that the films may be successively exposed without removing the holder from the mouth.

The invention possesses other advantageous features, some of which, with the foregoing, will be set forth at length in the following description, where I shall outline in full, the process of my invention and that form of the apparatus which I have selected for illustration in the drawings accompanying and forming part of the present specification. In said drawings I have shown one form of the apparatus of my invention, but it is to be understood that I do not limit myself to such form, since the invention, as set forth in the claims, may be embodied in a plurality of forms.

Referring to said drawings:—

Figure 1 is a sectional view of a portion of the lower jaw, showing one form of my device in place, and illustrating the method of taking stereoscopic intraoral radiographs.

Fig. 2 is a perspective view of one form of the device.

Fig. 3 is a vertical section, on an enlarged scale, of the film packet holder of my invention.

Fig. 4 is a perspective view of two film packets.

The desirability of stereoscopic intraoral radiographs is well known, but as far as I am aware, no method has heretofore been devised for successfully taking radiographs of this nature. By taking radiographs of this nature and then examining the films simultaneously with a stereoscope, the dentist is enabled to observe the tooth arrangement in three dimensions.

In accordance with my invention, I provide a holder for a plurality of film packets, which holder, with its contained packets, is placed in the mouth of the patient and held stationary, with respect to the teeth, during the exposures of the films. The film packets are arranged in contact in the holder, and after the first exposure, the front packet is removed, without moving the holder, and the relation of the source of radiation with respect to the teeth having been changed, the rear packet is exposed. The film packet comprises a radio-opaque backing 2 forming a frame within which two sensitized films 3—4, are usually contained, the packet being closed at the front by a radio-lucent, light opaque sheet 5.

The holder 6, preferably made of radiolucent material and preferably provided with an aperture 7 in its front wall, to permit the free passage of the rays, is usually made of such size as to snugly contain two film packets 8—9, in side-by-side relation. The packets are arranged with their radiolucent faces forward, the backing 2 of the front packet serving to shield the films in the rear packet, until the front packet is removed. The holder is open along one end so that the packets may be removed. The rear packet 9 is preferably adhesively attached to the rear wall of the holder as by a paper hinge 12. The front packet 8 is preferably provided with a tab 13, by which it may be readily withdrawn, and when the two packets do not seat snugly in the holder, a small wooden wedge may be employed for crowding them.

The holder may be held stationary in the mouth during the successive exposures, by the finger of the patient or mechanical means may be employed for holding it in position. One form of mechanical holding means is shown in Fig. 2 and comprises a tray 14, such as a dental impression tray, to which the holder is attached by a flexible, non-resilient wire 15. The tray is filled with a plastic material, such as is employed in taking dental impressions, is pressed firmly over one or more teeth, so that it forms a firm attachment, and the holder is then properly positioned behind the teeth to be radiographed.

In taking the radiographs, the holder containing the film packets is properly arranged and held in the mouth. The front film packet is then exposed to rays emanating from a suitable source 16 of Roentgen rays.

The front film packet is then removed and the relation of the source 16 to the holder altered, either by moving the source 16 or by moving the patient. The distance of movement is preferably equal to the distance between the eyes or about two and one-half inches and the movement is in a direction to displace the shadow caused by the tooth, in the direction of the longitudinal axis of the teeth. After the adjusted relation between the source and the tooth has been established, the source is again energized to expose the rear film packet.

The films are subsequently developed, and a film from each packet arranged in a frame, in spaced relation and over apertures in the frame and viewed through a stereoscope, producing an image having three dimensions, so that the dentist may be fully advised of existing conditions.

I claim:

1. The method of producing stereoscopic intraoral radiographs which comprises arranging two superposed sensitized films separated by an interposed radio-opaque member in the mouth, exposing the front film, removing the front film and the radio-opaque member from the mouth, changing the relative positions of the source of radiation and the remaining film without moving the film with respect to the teeth and exposing the remaining film.

2. The method of producing stereoscopic intraoral radiographs which comprises arranging in the mouth, two superposed film packets, exposing the front packet to rays from a source of radiation, removing the front packet from the mouth without moving the rear packet, changing the relative positions of the source of radiation and the rear packet and exposing the rear packet.

3. A device of the class described comprising a relatively flat frame open at one end, two superposed film packs in said frame, and frangible means for retaining one of said packs in position after removal of the other pack.

4. A device of the class described comprising a film holder adapted to be positioned in the mouth, a plurality of superposed films adapted to be removably positioned in said holder, and radio-opaque screens interposed between said films.

5. A device for taking stereoscopic intraoral radiographs comprising a film packet holder, and a plurality of film packets in said holder arranged in superposed relation, each packet consisting of a film, a radio-lucent screen in front of said film, and a radio-opaque screen behind said film.

6. A device for taking stereoscopic intraoral radiographs comprising a film holder having front and rear portions, two films in said holder in superposed position, a radio-opaque screen between said films and attached to the front film, and means for removing said front film without disturbing the rear film.

In testimony whereof, I have hereunto set my hand.

SIDNEY K. ROSENTHAL.